United States Patent
Jansen et al.

(10) Patent No.: US 6,388,420 B1
(45) Date of Patent: May 14, 2002

(54) SYSTEM AND METHOD FOR SENSORLESS ROTOR TRACKING OF INDUCTION MACHINES

(75) Inventors: Patrick Lee Jansen, Alplaus; William James Premerlani, Scotia; Luis Jose Garces Rivera, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/704,593

(22) Filed: Nov. 3, 2000

(51) Int. Cl.$^7$ ................................................. H02P 7/62
(52) U.S. Cl. ........................ 318/799; 318/801; 318/809
(58) Field of Search ......................... 318/727, 798–802, 318/807–811

(56) References Cited

U.S. PATENT DOCUMENTS

| | | | |
|---|---|---|---|
| 4,418,308 A | * 11/1983 | Bose | 318/803 |
| 4,453,116 A | * 6/1984 | Bose | 318/727 |
| 4,677,360 A | * 6/1987 | Garces | 318/803 |
| 4,968,925 A | * 11/1990 | De Doncker | 318/727 |
| 5,708,346 A | * 1/1998 | Schob | 318/803 |
| 6,107,774 A | * 8/2000 | Yamada et al. | 318/807 |

OTHER PUBLICATIONS

Donald S. Zinger, Et Al, "A Direct Field–Oriented Controller for Induction Motor Drives Using Tapped Stator Windings", IEEE Trans on Power Electronics, vol. 5, No. 4, Oct. 1990, pp. 446–453.

Patrick L. Jansen, Et Al, "Transducerless Position and Velocity Estimation in Induction and Salient AC Machines", IEEE Trans on Industry Applications, vol. 31, No. 2, Mar./Apr. 1995.

MW Degner, Et Al., "Using Multiple Saliencies for the Estimation of Flux, Position, and Velocity in AC Machines", IEEE Industry Applications Annual Meting, 1997, pp. 760–767.

KD Hurst, Et Al, "Speed Sensorless Field–Oriented Control of Induction Machines Using Current Harmonic Spectral Estimation", 1994 IEEE, pp. 601–607.

A. Ferrah, Et Al., "Modern Spectral Estimation Methods and Induction Motor Design for Real–Time Speed Estimation in Sensorless Vector Drives", ICEM96 Proceedings, International Conference on Electrical Machines Part, vol. 2, pp. 476–481.

B. Hammerli, Et Al, "A Rotor Speed Detector for Induction Machines Utilizing Rotor Slots Harmonics and an Active Three–Phase Injection", Swiss Federal Institute of Technology, pp. 599–604.

J. Holtz, "Sensorless Position Control of Induction Motors—An Emerging Technology", IEEE Trans on Industrial Electronics, vol. 45, No. 6, Dec. 1998, pp. 841–852.

JW Dixon, Et Al., "A Precise Induction Motor Speed Estimator, Based on a Fixed Carrier Frequency Signal", Dept of Electrical Engineering, Universidad Catolica De Chile, Casilla 306, Coreo 22, Santiago, Chile, pp. 199–203.

* cited by examiner

*Primary Examiner*—Bentsu Ro
(74) *Attorney, Agent, or Firm*—Ann M. Agosti; Jill M. Breedlove (57) ABSTRACT

A drive system comprises a rotor position and velocity tracker adapted to decouple fundamental frequency effects of a zero sequence signal of an induction machine from the zero sequence signal and to use a resulting error signal to estimate a position and a velocity of a rotor of the induction machine.

35 Claims, 4 Drawing Sheets

SYSTEM AND METHOD FOR SENSORLESS ROTOR TRACKING OF INDUCTION MACHINES

BACKGROUND

The invention relates generally to induction machines and more particularly to sensorless rotor tracking of induction machines.

The elimination of rotor shaft transducers such as rotor position and speed sensors is highly desirable to reduce cost, to reduce total motor package size, and to improve system reliability. Rotor shaft transducers tend to be a major source of failure and expense in ac machine drives.

Jansen et al., U.S. Pat. Nos. 5,585,709 and 5,565,752, for example, describe a method of control whereby high frequency signal injection is used to track the rotor angular position and velocity of an induction machine having a rotor providing an impedance that varies with rotor position. Various means are presented whereby an induction machine rotor can be modified to introduce position dependent impedances that are detectable from the stator terminal via signal injection.

Degner et al., "Using Multiple Saliencies for the Estimation of Flux, Position, and Velocity in AC Machines," IEEE Industry Applications Society Annual Meeting, New Orleans, La., 1997, pp. 760–767, describes the tracking of rotor position and velocity of an induction machine with an unskewed rotor via detection of impedance variations due to rotor slotting. In most induction machines smaller than 1000 hp, the rotor slots are skewed causing the impedance variation due to slotting to be nearly undetectable with the resolution of standard current and/or voltage feedback sensors currently used in motor drives.

Zinger et al., "A Direct Field-Oriented Controller for Induction Motor Drives Using Tapped Stator Windings," IEEE Transactions on Power Electronics, 1990, pp. 446–453, states that the effect of slotting is greatly enhanced in the neutral voltage of WYE (Y or star) connected machines. According to Zinger et al., by summing the three instantaneous line-neutral (phase) voltages, the fundamental voltage components are removed via cancellation, leaving the zero sequence components which include saturation-induced, slot-ripple-induced, and inverter-induced zero sequence voltages. A phase-locked loop was described as being used to lock onto the slot-ripple-induced zero sequence voltage and provide a rotor speed estimate. Because both the amplitude and frequency of the slot-ripple-induced voltage were proportional to speed, the method was not successful at low speeds. Furthermore direction of rotation could not be determined because quadrature signals were not available and the frequency of the tracked slot-ripple-induced voltage was centered about zero.

A number of alternative methods of tracking rotor velocity have been investigated using fast Fourier transform (FFT) based approaches with one example being Hurst et al., "Speed Sensorless Field-Oriented Control of Induction Machines Using Current Harmonic Spectral Estimation," IEEE-Industry Applications Society Annual Meeting, 1994, pp. 601–607. The fundamental limitation of these approaches is the poor dynamic performance resulting from the requirement of numerous cycles to be sampled by the FFT method, thus precluding operation near zero speed and achieving high dynamic performance control.

Holtz, "Sensorless Position Control of Induction Motors—An Emerging Technology," IEEE Transactions on Industrial Electronics, Vol. 45, No. 6, December 1998, pp. 840–852, describes dynamic tracking of rotor position and velocity via tracking of the rotor slot impedance variation through the combination of special inverter PWM voltage switching and voltage measurement sampling utilizing the zero sequence component of a WYE connected machine. The main limitations of this method are the requirement for a high number of voltage measurement samples per PWM inverter switching cycle, a special inverter PWM switching pattern that introduces additional torque ripple and losses into the machine, and the need for an additional neutral voltage connection and voltage sensor compared with conventional motors and drives.

Hammerli et al., "A Rotor Speed Detector for Induction Machines Utilizing Rotor Slots Harmonics and an Active Three Phase Injection," Proceedings of EPE'87, 1987, pp. 599–604, describes a method of rotor speed detection utilizing rotor slot harmonics and active three-phase signal injection in WYE-connected machines and states that speed can be detected over the range of 2% to 100% of the nominal rotor speed but not at near zero speeds.

It would therefore be desirable to have a system and method enabling accurate rotor velocity and position tracking of polyphase induction machines without need for rotor position shaft sensors (that is "tachless" or "sensorless" control) including during near zero frequency and velocity operating conditions.

BRIEF SUMMARY

Briefly, in accordance with one embodiment of the present invention, a drive system comprises a rotor position and velocity tracker adapted to decouple fundamental frequency effects of a zero sequence signal of an induction machine from the zero sequence signal and to use a resulting error signal to estimate a position and a velocity of a rotor of the induction machine.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTIONS

In one embodiment of the present invention, a drive system adapted for sensorless rotor tracking includes (a) machine drive controls for using a command signal and a high-frequency ac injected signal to provide ac drive power to an induction machine, and (b) a rotor position and velocity tracker adapted to decouple fundamental frequency effects of a zero sequence signal of the induction machine from the zero sequence signal and to use a resulting error signal to estimate a position and a velocity of a rotor of the induction machine.

Figure 6:
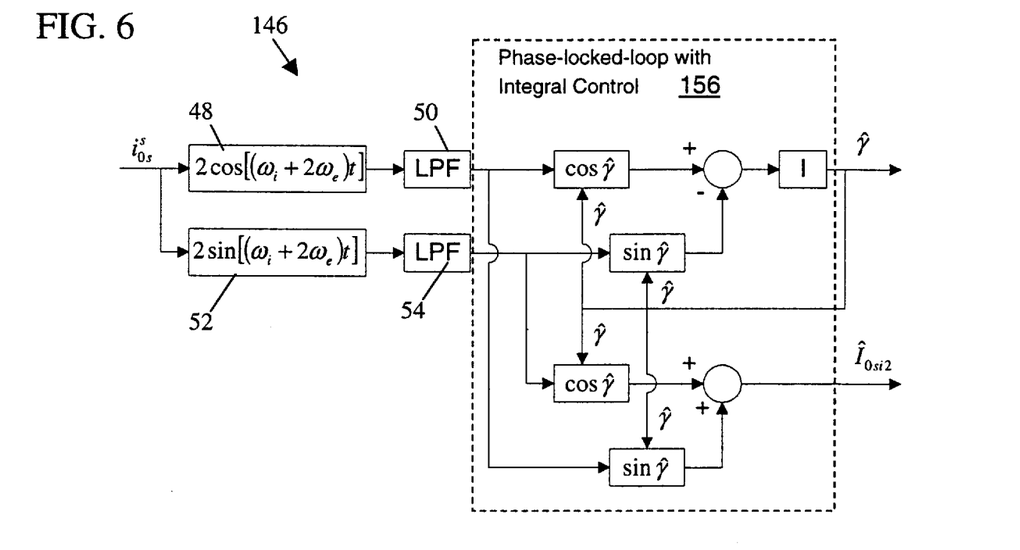
Figure 7:
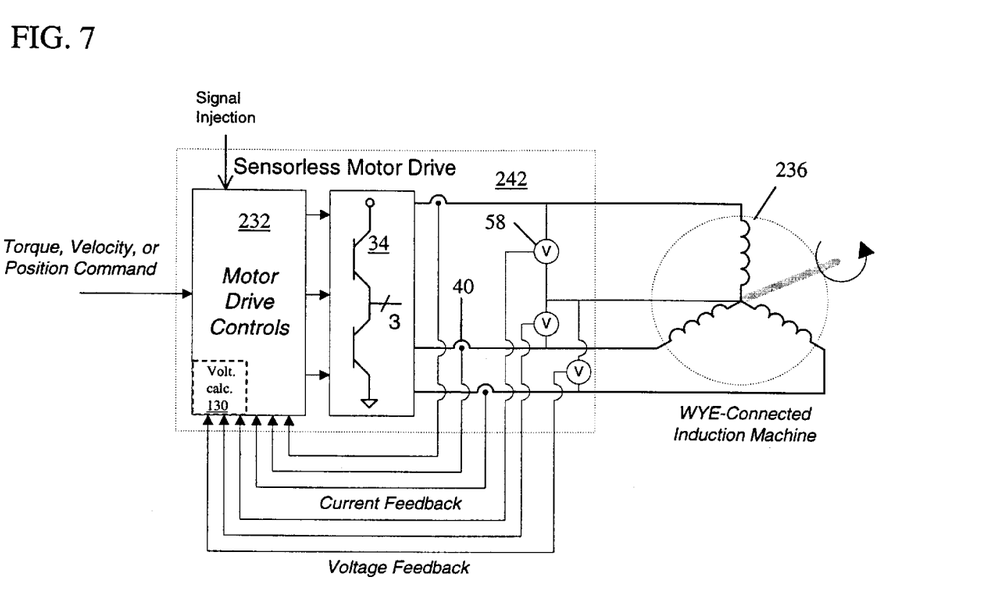
FIGS. 7–8 are diagrams of drive systems of several embodiments of the present invention.
Figure 8:
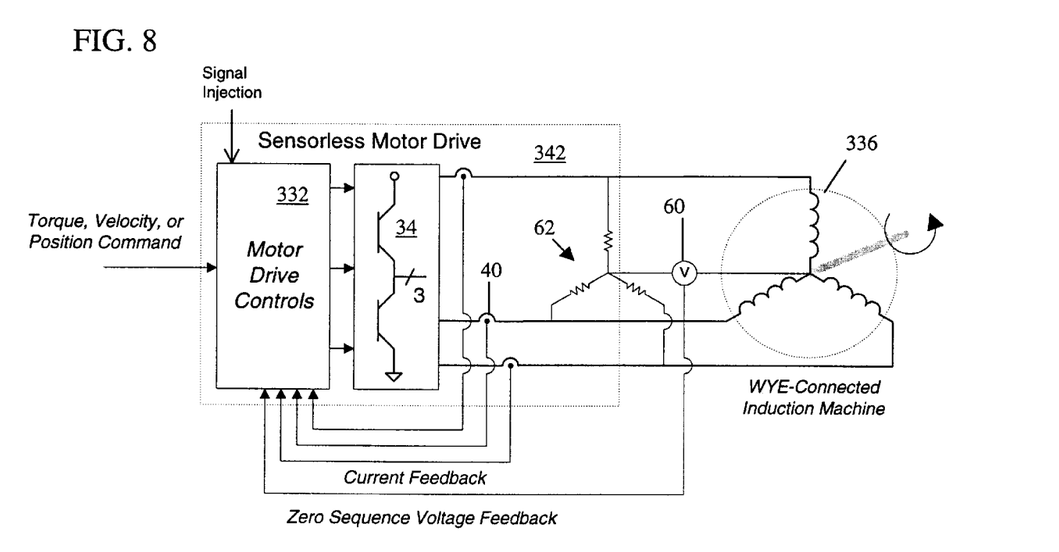

The present invention is applicable whether the ac induction machine is operated as a motor or as a generator and whether the ac induction machine is a delta-connected machine (described with respect to FIGS. 1–6) or a WYE-connected machine (described with respect to FIGS. 7–8). Although three-phase machines are depicted, the invention is also applicable to any polyphase machine, including, for example, two, five, and six phase machines. The invention can also be extended to machines with multiple delta or WYE connections. As used herein "induction machine" is intended to encompass all forms of asynchronous machines in addition to squirrel cage induction machines.

Figure 1:
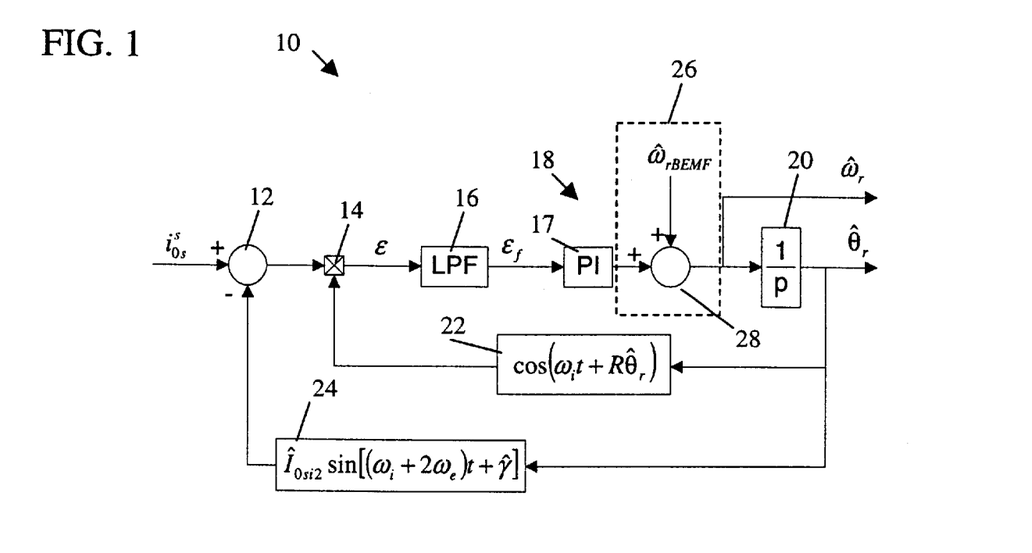
FIGS. 1–2 are diagrams of rotor position and velocity trackers of several embodiments of the present invention.
Figure 2:
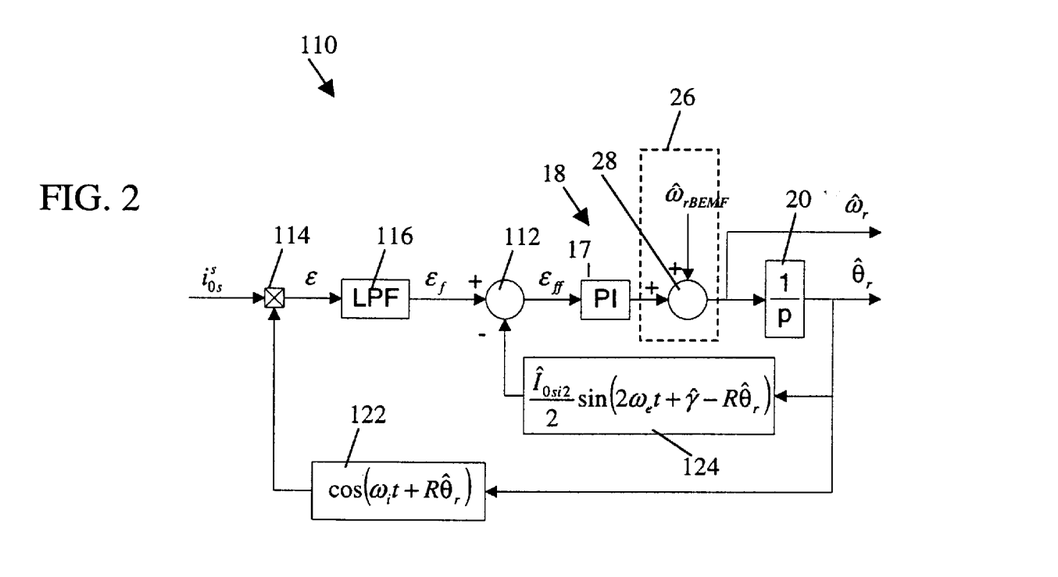
Figure 3:
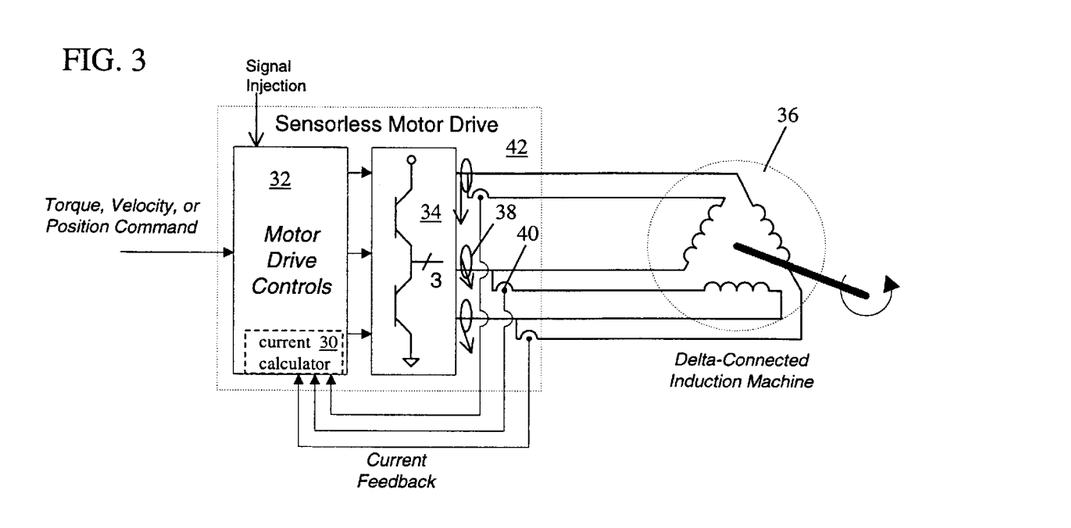
FIGS. 3–4 are diagrams of drive systems of several embodiments of the present invention.
Figure 4:
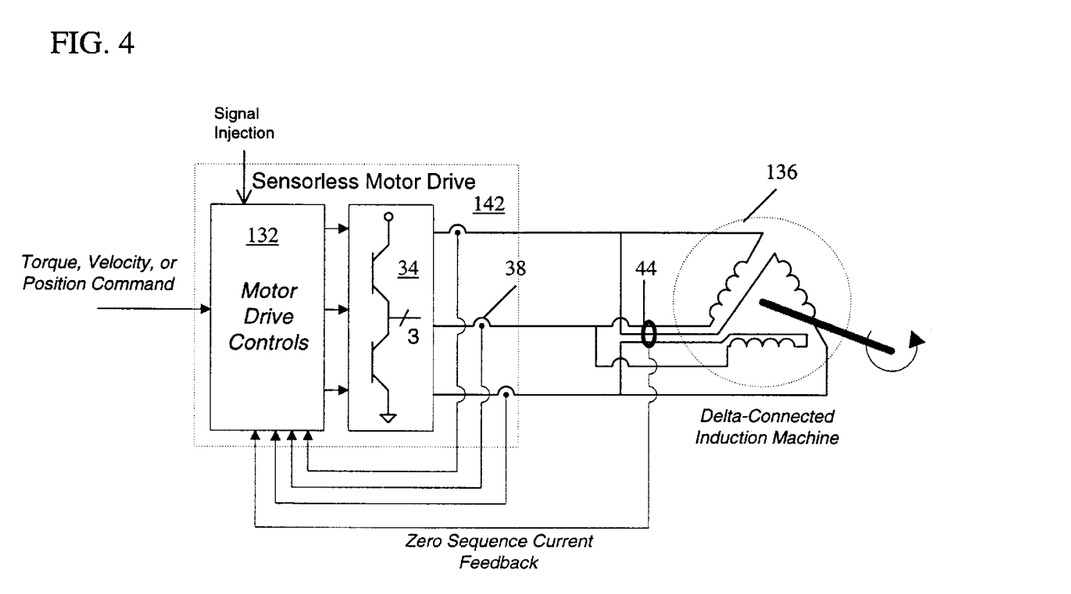

FIGS. 1–2 are diagrams of rotor position and velocity trackers 10 and 110, and FIGS. 3–4 are diagrams of drive systems 42 and 142 of several embodiments of the present invention wherein the respective ac machine comprises a delta-connected ac machine 36 and 136. Drive systems typically include machine drive controls 32, 132 which control inverters 34 for supplying power to respective ac machines 36, 136. A rotor position and velocity tracker 10 or 110 may be included within the machine drive controls or may comprise a separate control unit. For delta-connected induction machines, the zero sequence signal comprises a zero sequence current signal. For both WYE-connected and delta-connected machines the high-frequency ac injected signal may comprise a current signal or a voltage signal.

In one example, a balanced polyphase high-frequency voltage signal is injected into the machine of the form:

$$\begin{bmatrix} v_{qsi}^s \\ v_{dsi}^s \end{bmatrix} = V_{si} \begin{bmatrix} \cos\omega_i t \\ \sin\omega_i t \end{bmatrix} \quad (1)$$

The two main zero sequence current signal components related to the ac signal injection and rotor slotting will be of the form:

$$i_{0si} = I_{0si1} \sin(\omega_i t + R\theta_r) + I_{0si2} \sin[(\omega_i + 2\omega_e)t + \gamma] \quad (2)$$

or simply:

$$i_{0si}^s = i_{0si1} + i_{0si2} \quad (3)$$

wherein R=number of rotor slots per pole pair, θr=rotor angular position, γ=fixed phase relationship, $\omega_i$=signal injection frequency, $\omega_e$=fundamental excitation frequency.

The first term ($i_{0si1}$) includes the desirable rotor position information whereas the second term ($i_{0si2}$) is dependent upon the fundamental frequency and is related to saturation. Because the second term does not contain rotor position information, the second term acts a disturbance to rotor slot tracking. The second term may be useful, however, to obtain information about the position of the rotor flux, which can then be used for field orientation. The total zero sequence current is $i_{0s}^s$ and includes components in addition to the two main zero sequence current signal components. These components include fundamental induced saturation and slotting harmonics, and inverter switching harmonics, for example.

Heterodyning and subtracting can be used to decouple the second term and to provide an error signal for use by the rotor position and velocity tracker. An estimate of the fundamental excitation component, $\hat{i}_{0si2}$, is used to attenuate its affect either prior or after heterodyning.

With correction prior to heterodyning, as shown in FIG. 1, a subtractor 12 subtracts the fundamental excitation component of the zero sequence signal from the zero sequence signal to provide a rotor position indicator component, and a multiplier 14 heterodynes the rotor position indicator component of the zero sequence signal and provides the error signal.

The subtraction and heterodyning can be mathematically represented by:

$$\epsilon = (i_{0si}^s - \hat{i}_{0si2}^s)\cos(\omega_i t + R\hat{\theta}_r), \quad (4)$$

wherein $$\hat{i}_{0si2} = \hat{I}_{0si2} \sin[(\omega_i + 2\omega_e)t + \hat{\gamma}]. \quad (5)$$

Equation 4 can then be rewritten as:

$$\epsilon = [I_{0si1} \sin(\omega_i t + R\theta_r) + I_{0si2} \sin[(\omega_i + 2\omega_e)t + \gamma] - \hat{I}_{0si2} \sin[(\omega_i + 2\omega_e)t + \hat{\gamma}]] \cos(\omega_i t + R\hat{\theta}_r) \quad (6)$$

With perfect decoupling, $$\varepsilon = \frac{I_{0si1}}{2}\{\sin[R(\theta_r - \hat{\theta}_r)] + \sin[2\omega_i t + R(\theta_r + \hat{\theta}_r)]\}, \text{ and} \quad (7)$$

low pass filtering leaves:

$$\varepsilon_f = LPF(\varepsilon) = \frac{I_{0si1}}{2}\sin[R(\theta_r - \hat{\theta}_r)], \quad (8)$$

wherein $\epsilon_f$ is a rotor position dependent error term that can be used to drive a controller 18 (which may include a phase-locked-loop or other tracking filter/observer 17, for example) to obtain an estimate of rotor velocity which can be used by an integrator 20 to estimate the rotor position.

The speed range of operation will depend upon the frequency of the signal injection and the number of rotor slots per pole pair. Preferably, the injection frequency is selected to be considerably higher than the rotor slot frequency of the maximum operating speed; i.e., $$\omega_i \gg R\omega_{r\,max}, \quad (9)$$

wherein R represents the number of rotor slots per pole pair, which for typical industrial motors is between 16–32 and usually depends upon the pole number. For a four-pole motor with 28 slots per pole pair and a top speed of 1800 RPM, the injection frequency would then preferably be above 850 Hz.

For many machine drive systems, especially high power systems, using low speed operational sensorless control schemes of the present invention at low to near zero speeds and then transitioning to a more conventional back-emf based sensorless control approach for high speed operation may be useful. Conventional back-emf based approaches perform satisfactorily at speeds above about two percent of rated speed, for example. Alternatively, tracking of the slot ripple zero sequence component that is associated with the fundamental excitation is also useful at higher speeds even without signal injection.

To improve the dynamic tracking capability, as well as provide a smooth transition to high speed operation beyond where slot ripple tracking via signal injection is most beneficial, a velocity estimate from a back-emf sensorless approach can be added as feedforward as shown by optional feedforward function 26 of controller 18. In one embodiment, rotor position and velocity tracker 10 includes optional adder 28 for adding an estimated back-emf velocity signal to the controlled error signal to estimate the rotor velocity and the integrator uses the estimated rotor velocity from adder 28 for the rotor position estimation. In embodiments where optional adder 28 is used, the adder may be always operational, or the adder may non-operational at near zero speeds and switched on at higher speeds when transitioning away from signal injection and slot tracking.

With fundamental excitation component correction after heterodyning, as shown in FIG. 2, a multiplier 114 heterodynes the zero sequence signal, and a subtractor 112 subtracts the fundamental excitation component of the heterodyned zero sequence signal from the heterodyned zero sequence signal to provide the error signal. Again, an optional feedforward function 26 can be used, if desired.

In the after heterodyning correction embodiment, the heterodyned signal is $$\epsilon = i_{0si}{}^s \cos(\omega_i t + R\hat{\theta}_r), \qquad (10)$$

which can be rewritten as $$\epsilon = [I_{0si1} \sin(\omega_i t + R\theta_r) + I_{0si2} \sin[(\omega_i + 2\omega_e)t + \gamma]]\cos(\omega_i t + R\hat{\theta}_r) \qquad (11)$$

and in turn rewritten as $$\varepsilon = \frac{I_{0si1}}{2}\{\sin[R(\theta_r - \hat{\theta}_r)] + \sin[2\omega_i t + R(\theta_r + \hat{\theta}_r)]\} + \qquad (12)$$
$$\frac{I_{0si2}}{2}[\sin(2\omega_e t + \gamma - R\hat{\theta}_r) + \sin((2\omega_i + 2\omega_e)t + \gamma + R\theta_r)].$$

Low pass filtering leaves:

$$\varepsilon_f = LPF(\varepsilon) = \frac{I_{0si1}}{2}\sin[R(\theta_r - \hat{\theta}_r)] + \frac{I_{0si2}}{2}\sin(2\omega_e t + \gamma - R\hat{\theta}_r), \qquad (13)$$

wherein the first term in the right hand side is the desired rotor position term, and the second term is the effective disturbance signal to be decoupled.

Assuming an estimate of the disturbance signal, correcting for the disturbance component yields:

$$\varepsilon_{ff} = \varepsilon_f - \frac{\hat{I}_{0si2}}{2}\sin(2\omega_e t + \hat{\gamma} - R\hat{\theta}_r) \qquad (14)$$
$$= \frac{I_{0si1}}{2}\sin[R(\theta_r - \hat{\theta}_r)] + \frac{I_{0si2}}{2}\sin(2\omega_e t + \gamma - R\hat{\theta}_r) -$$
$$\frac{\hat{I}_{0si2}}{2}\sin(2\omega_e t + \hat{\gamma} - R\hat{\theta}_r)$$

If disturbance term is accurately estimated, then the rotor position information is isolated:

$$\varepsilon_{ff} \cong \frac{I_{0si1}}{2}\sin[R(\theta_r - \hat{\theta}_r)]. \qquad (15)$$

To obtain a zero sequence current signal in a delta-connected machine, any one of a number of different techniques can be used. In one embodiment, for example, as shown in FIG. 3, a plurality of current sensors 38 (line current sensors) and/or 40 (phase current sensors) are used for measuring induction machine current signals, and a zero sequence current calculator 30 is used for calculating the zero sequence signal from the induction machine current signals.

If three phase currents are sensed, the zero sequence current signal is obtained from the summation of phase currents:

$$i_{0s}{}^s = i_{ph1}{}^s + i_{ph2}{}^s + i_{ph3}{}^s. \qquad (16)$$

If one phase and two line current sensors are used, the calculation is:

$$i_{0s}{}^s = 3i_{ph1}{}^s + 2i_{L2}{}^s + i_{L3}{}^s. \qquad (17)$$

If two phase and one line current sensors are used, the calculation is:

$$i_{0s}{}^s = i_{ph1}{}^s + 2i_{ph2}{}^s + i_{L3}{}^s. \qquad (18)$$

In the embodiment of FIG. 4, a zero sequence current sensor 44 is used for obtaining the zero sequence current signal. The sensor performs the function of phase current summation directly through electromagnetic coupling. The zero sequence sensor can be located either within the machine (e.g., inside a connection box) or within an inverter housing. Reductions in cabling are possible if the sensor is located within the machine. Because the sensor is responsible only for measuring the zero sequence component associated with the injected signal near the injected signal frequency, an ac-only sensor, such as a low-cost CT (current transformer) may be used. Furthermore, because the fundamental currents are canceled, the resolution of the sensor can be much higher than for a sensor that also must measure the fundamental component. Additionally, two or three line current sensors 38 can be used to perform the traditional current control and limiting functions of standard machine drives.

After the zero sequence current signal is obtained, several alternative methods can then be applied to obtain the magnitude and phase of the disturbance component. One example includes band-pass filtering at the injection frequency followed by envelope and zero crossing detection.

Figure 5:
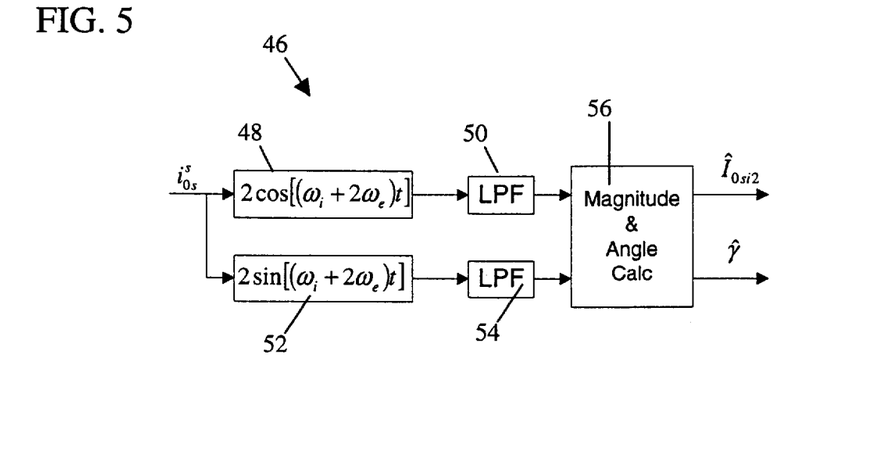
FIGS. 5–6 are diagrams of zero sequence disturbance component identifiers of several embodiments of the present invention.

FIGS. 5–6 are diagrams of zero sequence disturbance component identifiers of several embodiments wherein a zero sequence component identifier 46 is used for obtaining the fundamental excitation component of the zero sequence signal by heterodyning the zero sequence signal using parallel sine and cosine mutliplications (and respective heterodyne functions 48 and 52), low-pass-filtering the resulting two heterodyned signals (with respective low pass filters 50 and 54), and using the two filtered, heterodyned signals to obtain a phase and a magnitude of the fundamental excitation component.

Preferably, the phase and magnitude are obtained by calculations in a magnitude and angle calculator 56 as shown in FIG. 5. Alternatively, the phase and magnitude computations can be avoided via a phase-locked-loop with integral control 156 approach as shown in FIG. 6. In another embodiment, the heterodyning and phase-locking functions can be integrated to reduce the number of computations.

The bandwidth of the low-pass-filters should be substantially lower than the frequency spread between the injection signal frequency and the zero sequence side band due to rotor slotting. Since the magnitude and phase of the zero sequence disturbance signal is relatively independent of machine operating point, low bandwidth tracking is generally sufficient and can be performed either during a self-commissioning period prior to full drive control operation, or by slowly adapting on-line when the rotor speed is above a minimal threshold.

FIGS. 7–8 are diagrams of drive systems of several embodiments of the present invention wherein the induction machine 236 or 336 comprises a WYE-connected induction machine and wherein the zero sequence signal used by drive system 242, 342 comprises a zero sequence voltage signal. The approach for the WYE-connected machine parallels that of the delta-connected machine. For example, the high frequency injected ac signal into machine drive controls 32, 332 may comprise a voltage or current signal. A distinction is that the zero sequence signal comprises a voltage signal that is processed in a corresponding manner as the zero sequence current signals discussed above.

In one example, a balanced polyphase high-frequency current signal is injected into the machine of the form:

$$\begin{bmatrix} i^s_{qsi} \\ i^s_{dsi} \end{bmatrix} = I_{si} \begin{bmatrix} \cos\omega_i t \\ \sin\omega_i t \end{bmatrix}. \tag{19}$$

The zero sequence components related to the signal injection will be of the form:

$$v_{0si} = V_{0si1} \sin(\omega_i t + R\theta_r) + V_{0si2} \sin[(\omega_i + 2\omega_e)t + \gamma] \tag{20}$$

or simply:

$$v_{0si}{}^s = v_{0si1} + v_{0si2}, \tag{21}$$

where in R=number of rotor slots per pole pair, θr=rotor angular position, and γ=fixed phase relationship.

In an analogous manner as with respect to the zero sequence current signal embodiments of FIGS. 1–2 above, heterodyning is used to isolate the rotor position information. An estimate of $v_{0si2}$ is used to attenuate its affect either prior or after heterodyning. Assuming post heterodyning correction, then:

$$\epsilon = v_{0si}{}^s \cos(\omega_i t + R\hat{\theta}_r) \tag{22}$$

$$\epsilon = [V_{0si1}\sin(\omega_i t + R\theta_r) + V_{0si2}\sin[(\omega_i + 2\omega_e)t + \gamma]]\cos(\omega_i t + R\hat{\theta}_r) \tag{23}$$

$$\varepsilon = \frac{V_{0si1}}{2}\{\sin[R(\theta_r - \hat{\theta}_r)] + \sin[2\omega_i t + R(\theta_r + \hat{\theta}_r)]\} + \frac{V_{0si2}}{2}[\sin(2\omega_e t + \gamma - R\hat{\theta}_r) + \sin[(2\omega_i + 2\omega_e)t + \gamma + R\hat{\theta}_r]]. \tag{24}$$

Low pass filtering leaves:

$$\varepsilon_f = LPF(\varepsilon) = \frac{V_{0si1}}{2}\sin[R(\theta_r - \hat{\theta}_r)] + \frac{V_{0si2}}{2}\sin(2\omega_e t + \gamma - R\hat{\theta}_r), \tag{25}$$

with the second term in the right hand side being a disturbance signal to be attenuated.

Correcting for the disturbance component yields $$\varepsilon_{ff} = \varepsilon_f - \frac{\hat{V}_{0si2}}{2}\sin(2\omega_e t + \hat{\gamma} - R\hat{\theta}_r) \tag{26}$$

$$= \frac{V_{0si1}}{2}\sin[R(\theta_r - \hat{\theta}_r)] + \frac{V_{0si2}}{2}\sin(2\omega_e t + \gamma - R\hat{\theta}_r) - \frac{\hat{V}_{0is2}}{2}\sin(2\omega_e t + \hat{\gamma} - R\hat{\theta}_r).$$

If the disturbance term is accurately estimated then $$\varepsilon_{ff} \cong \frac{V_{0si1}}{2}\sin[R(\theta_r - \hat{\theta}_r)], \tag{27}$$

wherein $\epsilon_{ff}$ is a rotor position dependent error term that can be used to drive a phase-locked-loop or tracking filter/observer to obtain accurate estimates of rotor position and velocity. Trackers of the same form as in FIGS. 1–2 can be used, with the input now being the zero sequence voltage, $v_{0si}{}^s$.

To obtain a zero sequence voltage signal in a WYE-connected machine, any one of a number of different techniques can be used. In one embodiment, for example, as shown in FIG. 7, a plurality of voltage sensors 58 are used for measuring induction machine voltage signals, and a zero sequence voltage calculator 130 is used for calculating the zero sequence voltage signal from the induction machine voltage signals.

In one embodiment, the zero sequence voltage signal is obtained by measuring the three phase (line-to-neutral) voltages as depicted in FIG. 7. The zero sequence voltage is calculated via summation of the measured phase (line-to-neutral) voltages; i.e., $$v_{0s}{}^s = v_{ph1}{}^s + v_{ph2}{}^s + v_{ph3}{}^s. \tag{28}$$

Additional current sensors are also illustrated to perform the traditional roles of current control and limiting in machine drives but are not necessary for this embodiment.

The zero sequence voltage can alternatively be obtained via the measurement from one phase (line-to-neutral) and two line (line-to-line) voltage sensors; e.g., $$v_{0s}{}^s = v_{L12}{}^s - v_{L23}{}^s + 3v_{ph2}{}^s \tag{29}$$

In the embodiment of FIG. 8 a zero sequence voltage sensor 60 is used for obtaining the zero sequence voltage signal. The zero sequence voltage can be obtained through the use of a reference neutral 62 coupled to the induction machine. In one embodiment, an artificial reference neutral is created via a resistance network. Alternatively, the midpoint between two split capacitors across the inverter DC bus can be used as a reference neutral for the zero sequence voltage sensor.

Embodiments of the present invention thus combine high-frequency signal injection with zero sequence signal isolation to enable tracking of rotor slot ripple, and hence provide accurate tracking of rotor position, speed, and rotation direction. Unlike prior approaches to tracking rotor slot ripple, embodiments of the present invention enable the use of voltage-controlled oscillator (VCO) based feedback sensors with conventional sampling and inverter switching rates, can provide instantaneous rotational direction information, and can be fully functional down to standstill. Because the zero sequence component is measured and used, these embodiments can be applied to a wide range of machine designs include those with slot combinations that produce negligible slotting effects in the line terminals.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A drive system comprising: a rotor position and velocity tracker adapted to decouple fundamental frequency effects of a zero sequence signal of an induction machine from the zero sequence signal and to use a resulting error signal to estimated a position and a velocity of a rotor of the induction machine.

2. The drive system of claim 1 wherein the rotor position and velocity tracker comprises
   a subtractor for subtracting a fundamental excitation component of the zero sequence signal from the zero sequence signal to provide a rotor position indicator component, and
   a multiplier for heterodyning the rotor position indicator component and providing the error signal.

3. The drive system of claim 2 wherein the rotor position and velocity tracker further comprises
   a controller for using the error signal to provide an estimate of the rotor velocity to drive the error signal to zero, and
   an integrator for using the estimated rotor velocity to estimate the rotor position.

4. The drive system of claim 3 wherein the controller includes a tracking filter/observer for driving the error signal to zero and an adder for adding an estimated back-emf velocity signal to provide the estimate of the rotor velocity.

5. The drive system of claim 1 wherein the rotor position and velocity tracker comprises
   a multiplier for heterodyning the zero sequence signal, and
   a subtractor for subtracting a fundamental excitation component of the heterodyned zero sequence signal from the heterodyned zero sequence signal to provide the error signal.

6. The drive system of claim 5 wherein the rotor position and velocity tracker further comprises
   a controller for using the error signal to provide an estimate of the rotor velocity to drive the error signal to zero, and
   an integrator for using the estimated rotor velocity to estimate the rotor position.

7. The drive system of claim 6 wherein the controller includes a tracking filter/observer for driving the error signal to zero and an adder for adding an estimated back-emf velocity signal to provide the estimate of the rotor velocity.

8. The drive system of claim 1 further including machine drive controls for using a command signal and a high-frequency ac injected signal to provide ac drive power to the induction machine, and wherein the high-frequency ac injected signal is a current signal or a voltage signal.

9. The drive system of claim 8 wherein the induction machine comprises a delta-connected induction machine and wherein the zero sequence signal comprises a zero sequence current signal.

10. The drive system of claim 9 further including a plurality of current sensors for measuring induction machine current signals and a zero sequence current calculator for calculating the zero sequence current signal from the induction machine current signals.

11. The drive system of claim 10 further including a zero sequence current sensor for obtaining the zero sequence current signal.

12. The drive system of claim 11 wherein the zero sequence current sensor comprises a current transformer.

13. The drive system of claim 9 further including a zero sequence component identifier for obtaining the fundamental excitation component of the zero sequence signal by heterodyning the zero sequence signal using parallel sine and cosine mutliplications, low-pass-filtering the resulting two heterodyned signals, and using the two filtered, heterodyned signals to obtain a phase and a magnitude of the fundamental excitation component.

14. The drive system of claim 8 wherein the induction machine comprises a WYE-connected induction machine and wherein the zero sequence signal comprises a zero sequence voltage signal.

15. The drive system of claim 14 further including a plurality of voltage sensors for measuring induction machine voltage signals and a zero sequence voltage calculator for calculating the zero sequence voltage signal from the induction machine voltage signals.

16. The drive system of claim 15 further including a zero sequence voltage sensor for obtaining the zero sequence voltage signal.

17. The drive system of claim 16 wherein the zero sequence voltage sensor comprises a voltage sensor positioned across a reference neutral coupled to the induction machine.

18. A drive system comprising:
   machine drive controls for using a command signal and a high-frequency ac injected signal to provide ac drive power to an induction machine; and
   a rotor position and velocity tracker comprising
   a subtractor for subtracting a fundamental excitation component of a zero sequence signal from the zero sequence signal to provide a rotor position indicator component, and
   a multiplier for heterodyning the rotor position indicator component and providing an error signal;
   a controller for using the error signal to provide an estimate of the rotor velocity to drive the error signal to zero, and
   an integrator for using the estimated rotor velocity to estimate the rotor position.

19. The drive system of claim 18 wherein the controller includes a tracking filter/observer for driving the error signal to zero and an adder for adding an estimated back-emf velocity signal to provide the estimate of the rotor velocity.

20. The drive system of claim 18 wherein the induction machine comprises a delta-connected induction machine and wherein the zero sequence signal comprises a zero sequence current signal and further including a zero sequence current sensor for obtaining the zero sequence current signal.

21. The drive system of claim 18 wherein the induction machine comprises a WYE-connected induction machine and wherein the zero sequence signal comprises a zero sequence voltage sensor comprising a voltage sensor positioned across a reference neutral coupled to the induction machine for obtaining the zero sequence voltage signal.

22. A method for driving an induction machine comprising:
   using a command signal and a high-frequency ac injected signal to provide ac drive power to the induction machine;
   decoupling fundamental frequency effects of a zero sequence signal of the induction machine from the zero sequence signal to provide an error signal; and
   using the error signal to estimate a position and a velocity of a rotor of the induction machine.

23. The method of claim 22 wherein decoupling fundamental frequency effects of a zero sequence signal of the induction machine from the zero sequence signal to provide an error signal comprises subtracting a fundamental excitation component of the zero sequence signal from the zero sequence signal to provide a rotor position indicator component, and heterodyning the rotor position indicator component.

24. The method of claim 23 wherein using the error signal to estimate a position and a velocity of a rotor of the induction machine comprises using the error signal to provide an estimate of the rotor velocity to drive the error signal to zero, and using the estimated rotor velocity to estimate the rotor position.

25. The method of claim 24 wherein using the error signal to provide an estimate of the rotor velocity to drive the error signal to zero comprises adding an estimated back-emf velocity signal to provide the estimate of the rotor velocity.

26. The method of claim 23 wherein the fundamental excitation component of the zero sequence signal is obtained by heterodyning the zero sequence signal using parallel sine and cosine mutliplications, low-pass-filtering the resulting two heterodyned signals, and using the two filtered, heterodyned signals to obtain a phase and a magnitude of the fundamental excitation component.

27. The method of claim 22 wherein decoupling fundamental frequency effects of a zero sequence signal of the induction machine from the zero sequence signal to provide an error signal comprises heterodyning the zero sequence signal, and subtracting a fundamental excitation component of the heterodyned zero sequence signal from the heterodyned zero sequence signal to provide the error signal.

28. The method of claim 27 wherein using the error signal to estimate a position and a velocity of a rotor of the induction machine comprises using the error signal to provide an estimate of the rotor velocity to drive the error signal to zero, and using the estimated rotor velocity to estimate the rotor position.

29. The method of claim 28 wherein using the error signal to provide an estimate of the rotor velocity to drive the error signal to zero comprises adding an estimated back-emf velocity signal to provide the estimate of the rotor velocity.

30. The method of claim 22 wherein the high-frequency ac injected signal is a current signal or a voltage signal.

31. The method of claim 30 wherein the zero sequence signal comprises a zero sequence current signal.

32. The method of claim 29 wherein the zero sequence signal comprises a zero sequence voltage signal.

33. A method for induction machine rotor tracking comprising:

decoupling fundamental frequency effects of a zero sequence signal of the induction machine from the zero sequence signal to provide an error signal; and using the error signal to estimate a position and a velocity of the induction machine rotor.

34. The method of claim 33 wherein decoupling fundamental frequency effects of a zero sequence signal of the induction machine from the zero sequence signal to provide an error signal comprises subtracting a fundamental excitation component of the zero sequence signal from the zero sequence signal to provide a rotor position indicator component, and heterodyning the rotor position indicator component.

35. The method of claim 33 wherein decoupling fundamental frequency effects of a zero sequence signal of the induction machine from the zero sequence signal to provide an error signal comprises heterodyning the zero sequence signal, and subtracting a fundamental excitation component of the heterodyned zero sequence signal from the heterodyned zero sequence signal to provide the error signal.

* * * * *

UNITED STATES PATENT AND TRADEMARK OFFICE
CERTIFICATE OF CORRECTION

PATENT NO.    : 6,388,420 B1
DATED         : May 14, 2002
INVENTOR(S)   : Jansen et al.

It is certified that error appears in the above-identified patent and that said Letters Patent is hereby corrected as shown below:

Column 8,
Line 58, please delete "estimated" and insert -- estimate --.

Signed and Sealed this

Fourteenth Day of January, 2003

JAMES E. ROGAN
*Director of the United States Patent and Trademark Office*